Figure 1:
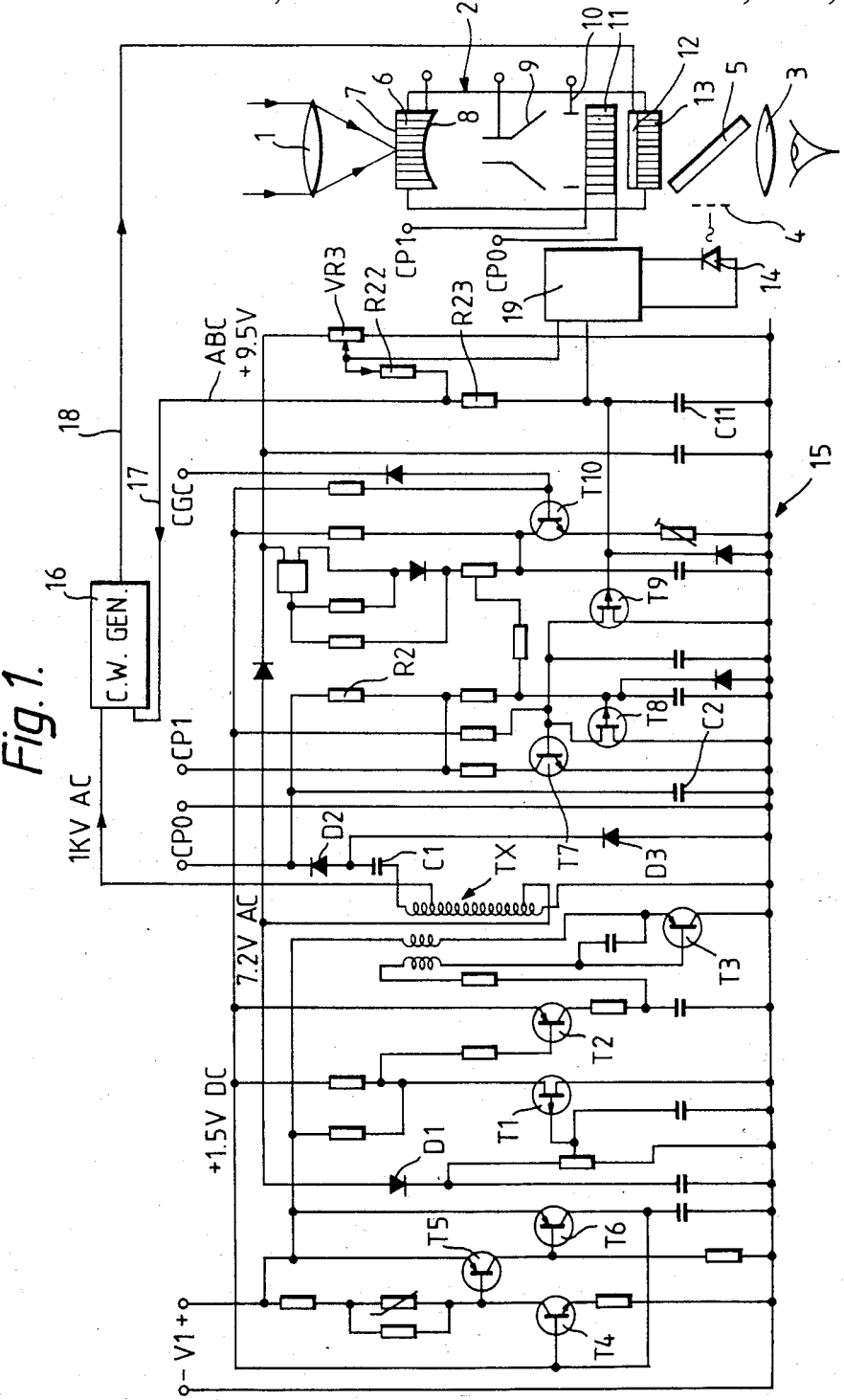

United States Patent [19]

Fairbend et al.

[11] Patent Number: 4,629,881

[45] Date of Patent: Dec. 16, 1986

[54] POWER SUPPLY FOR AN INTENSIFIED NIGHT SIGHT

[75] Inventors: Raymond J. Fairbend, Thornton Heath, England; Richard T. Holmshaw, Cadier en Keer, Netherlands; Colin H. Petley, Epsom, England

[73] Assignee: U.S. Philips Corp., New York, N.Y.

[21] Appl. No.: 713,959

[22] Filed: Mar. 20, 1985

[30] Foreign Application Priority Data

Mar. 23, 1984 [GB] United Kingdom ............... 8407622

[51] Int. Cl.⁴ .................... H01J 31/50; H01J 40/14
[52] U.S. Cl. ........................ 250/213 VT; 250/207
[58] Field of Search ................... 250/207, 213 VT; 313/103 CM, 105 CM

[56] References Cited

FOREIGN PATENT DOCUMENTS 2090012  6/1982  United Kingdom ......... 250/213 VT

Primary Examiner—David C. Nelms
Assistant Examiner—S. Allen
Attorney, Agent, or Firm—David R. Treacy

[57] ABSTRACT

In an image intensifier night sight having a graticule illuminator, it is desirable that the brightness of the graticule should be maintained in proportion to the intensifier output image brightness so that the visibility of graticule and scene details are preserved. Such a sight comprises an image intensifier (2) having an image photocathode input (8) and an electron luminescent output image screen (12), a magnifier (3) for viewing the output image screen, a graticule injection system (5) for superposing a graticule (4) upon the output image screen, and a light source (14) for illuminating said graticule. In a power supply (15) for such a sight means (19) are provided for deriving a signal related to the brightness of the output image screen and for controlling the brightness of the light source in response to the signal to maintain the ratio between output screen and graticule brightnesses substantially constant.

3 Claims, 3 Drawing Figures

POWER SUPPLY FOR AN INTENSIFIED NIGHT SIGHT

This invention relates to a power supply for an image intensifier night sight and more particularly for such a sight provided with an illuminated graticule for aiming or measuring purposes.

Such a night sight may comprise an image intensifier having an image input photocathode and an electron luminescent output image screen, a magnifier for viewing the output image screen, a graticule injection system for superposing a graticule upon the output image screen, and a light source for illuminating the graticule. Preferably, the light source provides light of a colour distinctive from that of the phosphor screen. Typically the phosphor screen will provide the output image in green light in which case the light source could, for example, be chosen to provide red light. A light emitting diode is one example of a suitable light source.

The brightness of the scene being viewed will vary greatly due, in part, to the wide range of night sky illumination available, from overcast starlight to full moonlight. Additionally the scene details may vary from open ground to tree cover. Hence the brightness of the output image could vary greatly. Measures are usually taken in the power supply of the image intensifier to sense the output image brightness and to control its brightness automatically to a constant overall value when it exceeds a threshold value. A night sight with such a graticule injection system is described in British patent application No. 2,090,012A and such a power supply is described in British patent application No. 2,070,818A.

However, below said threshold the output image brightness will vary, typically by a factor of at least ten. It is desirable to vary the graticule brightness correspondingly to maintain the visibility of both scene and graticule. If the graticule is too bright adjacent scene details may be obscured by glare. But if the graticule is too dim the observer may be unsure of its position in the scene in spite of the colour difference. If the sight is panned across a scene, considerable changes in average brightness may occur, for example when panning from open ground to tree cover. In this event the graticule brightness needs to be adjusted rapidly, a task which it would be difficult for the operator to perform accurately and continuously.

The invention provides a power supply for an image intensifier sight comprising an image intensifier having an image input photocathode and an electron luminescent output image screen which receives an electron current derived from said photocathode, a graticule injection system for superposing a graticule upon the output image screen, and a light source for illuminating said graticule, said power supply being characterised in that means are provided for deriving a signal from said electron current and related to the brightness of the output image screen, and in that means are provided for controlling the brightness of the light source in response to said signal to automatically maintain the ratio between the output image screen brightness and the graticule brightness substantially constant. The power supply may be characterised in that means are provided for varying the brightness gain of the image intensifier in response to the signal in such manner that, above a predetermined threshold output screen brightness, the screen brightness is substantially constant with increasing light input to the photocathode, and below the threshold the output screen brightness varies with light input to the phtotocathode.

The image intensifier is preferably a channel plate intensifier tube comprising a channel plate electron multiplier arranged to receive an electron input image from the photocathode and to supply an intensified electron output image to the output screen, the means for varying the brightness gain comprising means for varying the electron gain of the channel plate by varying a potential difference applied between input and output electrodes on said channel plate.

Figure 2:
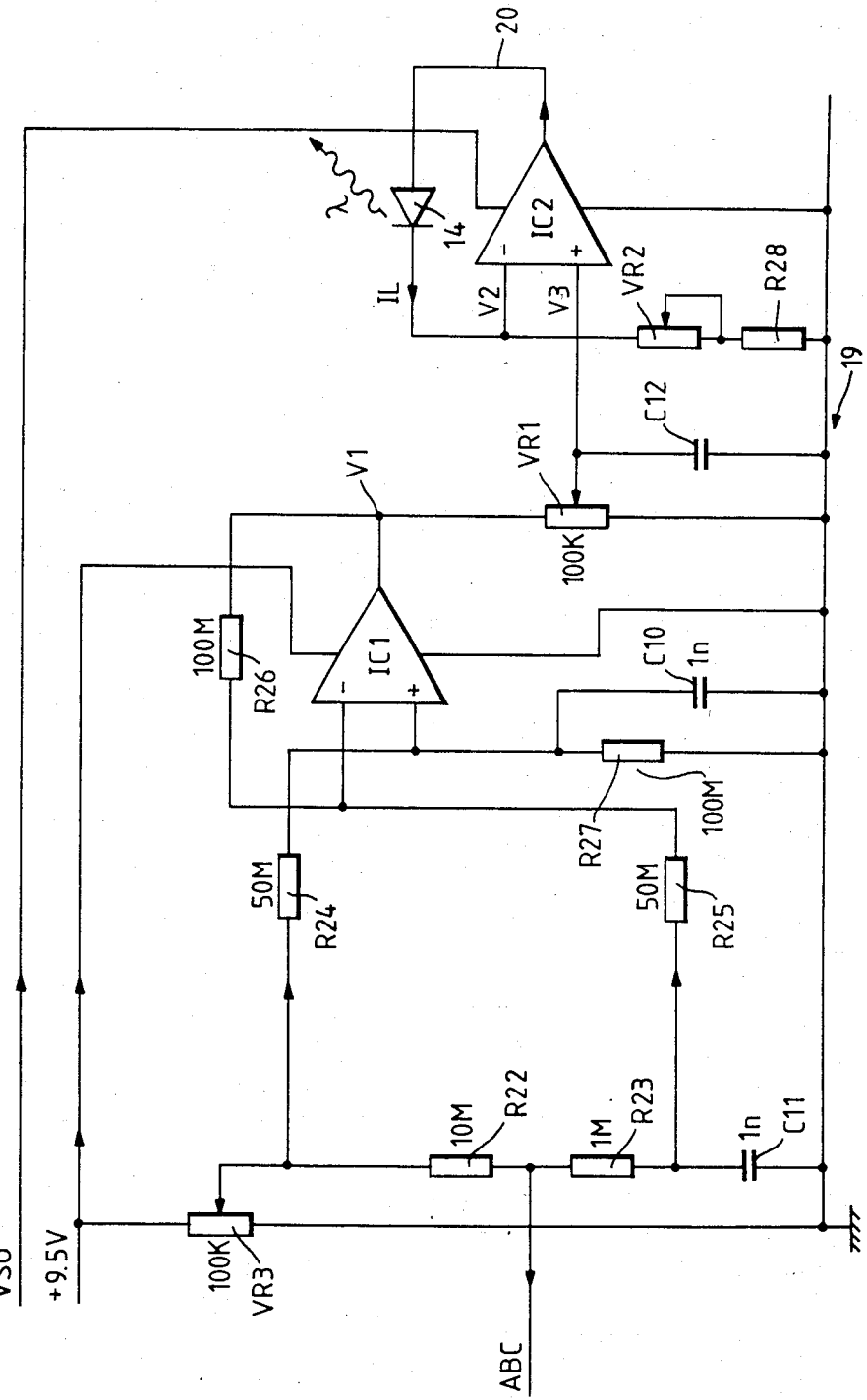
Figure 3:
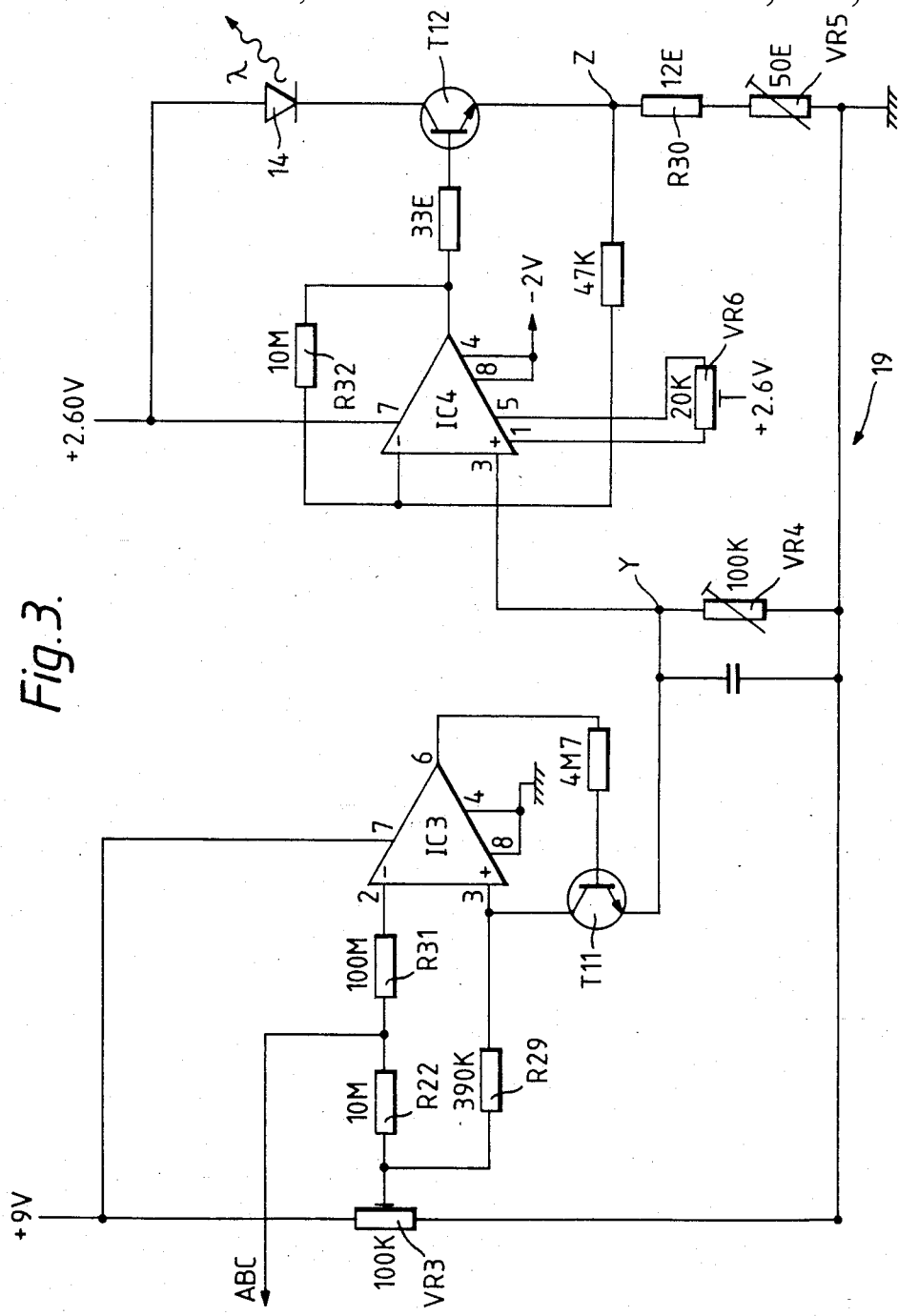

An embodiment of the invention will now be described, by way of example, with reference to the accompanying drawings in which:

FIG. 1 shows a schematic channel plate image intensifier sight with graticule injection in the eyepiece magnifier together with a power supply for the image intensifier, FIG. 2 shows a graticule illumination control circuit receiving a control input from the automatic brightness control (ABC) circuit of FIG. 1, and FIG. 3 shows an alternative graticule illumination control circuit.

Referring to FIG. 1, the image intensifier sight comprises an objective lens 1, a channel plate image intensifier tube 2, an eyepiece magnifier 3, a schematic graticule 4 and a semi-transmissive mirror 5 as a graticule injection system. The objective lens focusses a real inverted image of an external low brightness level, e.g. night-time, scene on the outer face 7 of an input fibre optic window 6. The image is transfered optically by the fibres to the inner face 8 on which the photocathode input screen is deposited and which then gives rise to an electron image of the scene. A conical anode 9 and a focus correction electrode 10, when supplied with suitable potentials relative to the photocathode, provide an inverted electron image on the input face of a channel plate electron multiplier 11, which electron image is then erect relative to the external scene. The channel plate has input and output electrodes on its two faces supplied with suitable potentials via terminals CP1 and CP0 by means to be described later. An intensification of the electron image, typically by a factor of 100 to 10,000 times, takes place in the channel plate by cascade secondary emission. The output electron image is incident on a luminescent output image screen 12 on the inner face of an output fibre optical window 13 in close proximity to the channel plate output face. The screen 12 is held at constant potential relative to the output face of the channel plate so that the output brightness depends on the channel plate output current only and is proportional to it up to current values at which screen saturation occurs. A suitable intensifier tube is the Mullard (Trade Mark) type XX1500.

The graticule injection system is shown only schematically. A light emitting diode 14 provides a light source for illuminating the graticule 4 with red light. A virtual image of the graticule is superposed on the outer face of the output fibre optic window 13 by the semi-transmissive mirror 5, and hence is in the same plane as the output image from the intensifier tube. Details of an optical arrangement in which the semi-transmissive mirror is incorporated in the magnifier 3 are given in British patent application No. 2,090,012. Alternatively, the light source may edge-illuminate a transparent plate on which the graticule has been etched on one face. This face is maintained in close but not optical contact with the fibre optic output face. In either event the red graticule contrasts well with the green output image. The optical details of graticule injection will not be elaborated furter since they are not relevant to the invention.

The power supply circuit 15 provides the EHT potentials needed to operate the intensifier and also contains an automatic brightness control (ABC) circuit which controls the intensifier gain so as to maintain the brightness of the output image sensibly constant over all but the lowest part of the range of external scene brightnesses which will be encountered. At the lowest scene illuminations, which are to be found in overcast starlight, the illumination is approximately 0.1 millilux. In starlight conditions this rises to 1.0 millilux. Quarter moonlight and full moonlight correspond to 10 mlux and 100 mlux respectively. At the very lowest levels of scene illumination the intensifier gain is at the maximum possible consistent with operating stability in the intensifier. As the scene brightness rises from this lowest level, there is a range of scene brightnesses over which the intensifier gain is maintained at maximum, the brightness of the output screen rising in proportion. Over this range the ABC circuit is inoperative and the graticule brightness should be increased in proportion to output screen brightness to maintain the visibility of both scene and graticule.

Automatic adjustment to maintain the ratio of the graticule brightness to the output screen brightness constant is provided by the circuit 19 to be described in detail with reference to FIG. 2 or FIG. 3.

Referring to FIG. 1, an input d.c. supply voltage V1 is supplied to an oscillator comprising transistors T1, T2, and T3. Output transistor T3 feeds a transformer TX. A tap on the transformer secondary feeds 7.2 V. a.c., via diode D1, to transistors T1 and T2 which regulate the oscillator output to a constant value in spite of changes in V1 between +2 volts and +5 volts. Transistors T4, T5 and T6 supply a regulated +1.5 volts to the rest of the circuit, including the oscillator. A second tap on the transformer secondary supplies 1 KV peak-to-peak a.c. to a Cockroft-Walton EHT generator 16. The 6 KV positive output 18 of generator 16 is fed to the luminescent output screen 12. The return output 17 of generator 16 is fed to the ABC circuit comprising transistors T7, T8, T9 and T10. The return output screen current flowing in load resistor R22 provides a positive-going signal to the gate of JFET transistor T9, via an RC filter R23 and C11. To this signal is added an adjustable positive offset voltage supplied by VR3 fed with +9.5 v volts d.c. derived from the 7.2 VAC oscillator output. The transformer secondary supplies +1.1 KV DC to the channel plate output electrode (CP0) via a voltage doubling rectifier C1, C2, D2 and D3. This CP0 output is also fed to a 200M load resistor R2 in the collector of transistor T7 which supplies the channel plate input electrode (CP1). A positive going input to the gate of T9 has the effect of reducing load current in T7, reducing the voltage drop across R2, reducing the voltage difference applied to the channel plate and hence reducing the intensifier gain. Not shown in this circuit diagram are further Cockroft-Walton generators, fed from the transformer secondary, which supply operating potentials to the photocathode 8, the focus anode 9 and the focus correction electrode 10.

In operation at the lowest input light levels, the output screen current is too low to produce a voltage rise across R22 sufficient to overcome the gate threshold, or pinch-off voltage, of T9 which is typically in the range of +4 to +6 volts. T7 remains bottomed and the channel plate voltage is a maximum. At a predetermined value of light input and hence output screen brightness, the voltage across R22 added to that supplied by VR3 overcomes the gate threshold of T9. Thereafter drain current flows in T9, reducing collector current in T7 and hence reducing the channel plate voltage and applying ABC. The open loop gain of the d.c. amplifier comprising T9, T7 and the channel plate is about 20,000. In consequence when the ABC circuit is brought into operation little further increase in output screen brightness occurs with increasing light input, the sum of the ABC and VR3 voltages remaining slightly above T9 pinch-off voltage. As a factory preset operation VR3 is set to compensate for the particular pinch-off voltage of T9, and also to select the light input level and hence a threshold output screen brightness at which ABC action starts.

The voltage at the junction of R22 and R23, which is the sum of the ABC control voltage and the constant offset voltage provided by VR3, is not directly suitable as a signal for controlling the brightness of the graticule light source 14. The voltage drop across R22 alone is used for this purpose.

FIG. 2 shows a circuit for providing a current through a light emitting diode, LED, used for graticule illumination which current is closely proportional to the voltage drop across R22. In a first stage of the circuit, an operational amplifier IC1 is connected as an inverting differential amplifier with a gain of 2. The junction of VR3 slider and R22 is connected via a 50M resistor R24 to the positive input of IC1 and thence via a 100M resistor R27 to ground. The voltage at the other end of R22 is applied, via the RC filter R23 and C11 and a second 50M resistor R25 to the negative input of IC 1 and thence via a 100M feedback resistor R26 to the output of IC1. This configuration is not influenced by any DC bias on the voltage across R22. A fraction V3 of the output voltage V1 of IC1 is provided by the potentiometer VR1 as input to a second stage. The precise value of R24 is chosen on test so that at minimum screen current, i.e. at zero input illumination, V1 is as close to ground as possible. The second stage is also an operational amplifier IC2 connected as a voltage to current converter, the light emitting diode 14 being connected in a feedback loop 20 of the amplifier.

Amplifier IC2 is a high gain d.c. amplifier, the fraction V3 of the output voltage V1, which fraction is proportional to screen brightness, being connected to its positive input. In this embodiment 1C1 and 1C2 are CMOS operational amplifiers Type 7611, capable of operation at very low supply voltages and hence tolerant of a wide range of supply battery voltage. The output current IL of IC2 is fed via LED 14, variable resistor VR2 and resistor R28 to ground. The potential drop V2 across VR2 and R28 in series is connected to the negative input of IC2. The operation of the feedback loop 20 ensures that V2 is maintained equal in magnitude but of opposite sign to V3. Thus the current IL in VR2 and R28 is maintained closely proportional to V3 over a wide range of currents. VR2 is a user operated control which sets the constant of proportionality between V3 and IL given by:

$$IL = \frac{V3}{R28 + VR2}$$

The factory setting procedure is as follows. First, the intensifier photocathode is blacked out and the value of R24 is trimmed so that V1 is as near to zero as possible. Second, VR2 is set to zero so that the values of IL obtained in the remainder of the procedure are a maximum. Third, the photocathode is illuminated so that the intensifier is in the ABC mode, i.e. so that increases of cathode illumination produce no further increases of screen brightness. Now VR1 and hence V3, is adjusted until V2 is given by:

$$V2 = R28 \cdot IL(max)$$

where IL(max) is the maximum current chosen to flow through LED14 which IC2 can supply, for example 5mA. The value of R28 is simultaneously chosen so that:

$$VSU(min) - VLED = IL(max) \cdot R28$$

where VSU(min) is the minimum intensifier battery supply voltage which may be applied to IC2 and VLED is the voltage drop across the LED. In practice VSU may range from +1.5 v to +3.4 v in a typical power supply.

This last condition ensures that the output stage of IC2 does not reach its upper voltage limit before V3 has reached its maximum value corresponding to ABC operation. Once the intensifier is in the hands of the user, VR2 is adjusted to provide a desired ratio of graticule brightness to screen brightness which ratio will then be maintained over the whole range of screen brightnesses.

FIG. 3 shows an alternative circuit to that of FIG 2. This circuit is designed first to provide an intermediate current which is a well defined multiple of the intensifier screen current but which is isolated from it. In a second part of the circuit, this intermediate current is effectively further multiplied to drive the LED. Also a fixed offset current is added to it to illuminate the graticule at a very low level in the absence of intensifier screen current. This maintains user confidence in the sight. It also enables him to aim at a small visible target in an otherwise black background, when otherwise total screen current would be too low to produce graticule illumination.

The intensifier screen current flowing in the ABC feedback loop causes a voltage drop across the screen current sense resistor R22, as in the FIG. 2 circuit. The integrated circuit IC3 is an operational amplifier connected as a high gain differential amplifier. The voltage across R22, added to the voltage provided by the ABC potentiometer VR3, is fed via an isolating resistor R31 to the inverting input of IC3. Via transistor T11, IC3 generates a current in, and hence a potential across, R29 connected at one end to the non-inverting input of IC3 and at the other end to VR3. The feedback action of IC3 forces the non-inverting input to be equal in potential to the inverting input. Thus, the product of the screen current and R22 is equal to the product of T11 current and R29. Thus the currents are in the inverse ratio of resistors R22 and R29. In the example of FIG. 3, R22 is 10M and R29 is 390K whence T11 current is approximately 25 times the screen current and the load on R22 is reduced by R31, 100M in the example. The current multiplication factor is independent of the voltage on the sliding contact of VR3, the ABC potentiometer.

The multiplied screen current in T11 flows through a variable resistance VR4, developing a voltage at point Y, relative to earth, which is proportional to the screen current. The potential at Y is fed to the positive, or non-inverting input of integrated circuit 1C4 which is an operational amplifier connected as a high gain differential amplifier. The output of 1C4 drives a transistor T12 supplying current to LED 14. This current also passes through R30 and VR5 in the emitter circuit of T12. The potential at point Z relative to ground is proportional to the LED current and is fed to the inverting input of 1C4 which also receives feedback from 1C4 output via R32. Feedback action adjusts the LED current until the Y and Z potentials are equal. The current gain is given by the ratio of VR4 to the sum of R30 and VR5. For example, with VR4 at its maximum value of 100K, R30 being 12 ohms and VR5 at zero, the gain would be 8300. VR6 provides an offset to the null adjustment of 1C4 so that in the absence of screen current (Y potential is zero) a fixed, low current is provided in the LED 14.

The setting up procedure for the circuit prior to use is typically as follows. First, the intensifier is illuminated sufficiently brightly that ABC is in operation so that the potential at Y is constant for any further increase in brightness. In this condition, VR4 is adjusted until the Y potential is 120 mv. Second, VR5 is set to zero and all intensifier illumination removed. The Y potential falls almost to zero. VR6 is then adjusted to give a voltage at point Z of 12 mv. The LED current then has a dynamic range of 10:1, the maximum output current being 10 ma. VR5 can then be adjusted by the user to reduce the maximum LED current to 2 ma without changing the dynamic range of the circuit.

The image intensifier may comprise a proximity channel plate image intensifier tube, image inversion being carried out within the tube by a twisted fibre optic component or outside the tube by optical means.

The signal related to the brightness of the output image may be derived from a photocell receiving light from the luminescent screen.

We claim:

1. A power supply for an image intensifier sight comprising an image intensifier having an image input photocathode and an electron luminescent output image screen which receives an electron current derived from said photocathode, a graticule injection system for superposing a graticule upon the output image screen, and a light source for illuminating said graticule, said power supply being characterised in that means are provided for deriving a signal from said electron current and related to the brightness of the output image screen, and in that means are provided for controlling the brightness of the light source in response to said signal to automatically maintain the ratio between the output image screen brightness and the graticule brightness substantially constant.

2. A power supply as claimed in claim 1, characterised in that means are provided for varying the brightness gain of the image intensifier in response to the signal in such manner that, above a predetermined threshold output screen brightness, the screen brightness is substantially constant with increasing light input to the photocathode, and below the threshold the output screen brightness varies with light input to the photocathode.

3. A power supply as claimed in claim 2, characterised in that the image intensifier is a channel plate intensifier tube comprising a channel plate electron multiplier arranged to receive an electron input image from the photocathode and to supply an intensified electron output image to the output screen, and in that said means for varying the brightness gain comprise means for varying the electron gain of the channel plate by varying a potential difference applied between input and output electrodes on said channel plate.

* * * * *